US011698871B2

(12) United States Patent
Chen et al.

(10) Patent No.: US 11,698,871 B2
(45) Date of Patent: Jul. 11, 2023

(54) METHOD FOR PRP/SGL HANDLING FOR OUT-OF-ORDER NVME CONTROLLERS

(71) Applicant: PetaIO Inc., Santa Clara, CA (US)

(72) Inventors: Yimin Chen, San Diego, CA (US); Fan Yang, Fremont, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 17/032,819

(22) Filed: Sep. 25, 2020

(65) Prior Publication Data

US 2022/0100681 A1 Mar. 31, 2022

(51) Int. Cl.
*G06F 13/16* (2006.01)
*G06F 12/0817* (2016.01)
*G06F 12/02* (2006.01)
*G06F 13/42* (2006.01)

(52) U.S. Cl.
CPC ...... *G06F 13/1673* (2013.01); *G06F 12/0246* (2013.01); *G06F 12/0824* (2013.01); *G06F 13/4234* (2013.01)

(58) Field of Classification Search
CPC ............. G06F 12/0246; G06F 12/0824; G06F 13/1673; G06F 13/4234
See application file for complete search history.

(56) References Cited

U.S. PATENT DOCUMENTS

| 8,127,100 | B1 * | 2/2012 | Swarnkar | G06F 12/0871 |
| | | | | 711/170 |
| 9,934,173 | B1 * | 4/2018 | Sakalley | G06F 13/4068 |
| 2010/0077266 | A1 * | 3/2010 | Kanno | G06F 11/1068 |
| | | | | 714/704 |
| 2015/0324281 | A1 * | 11/2015 | Takefman | G06F 12/0246 |
| | | | | 711/103 |
| 2017/0097908 | A1 * | 4/2017 | Simionescu | G06F 13/28 |
| 2017/0116117 | A1 * | 4/2017 | Rozen | G06F 12/0246 |
| 2019/0278662 | A1 * | 9/2019 | Nagrale | G06F 9/45558 |
| 2021/0026780 | A1 * | 1/2021 | Ahmed | G06F 3/0679 |
| 2021/0240641 | A1 * | 8/2021 | Benisty | G06F 13/1668 |

* cited by examiner

*Primary Examiner* — Eric T Oberly
(74) *Attorney, Agent, or Firm* — Stevens Law Group; David R. Stevens (57) ABSTRACT

Read latency for a read operation to a host implementing a PRP/SGL buffer is reduced by generating an address table representing the linked-list structure defining the PRP/SGL buffer. The address table may be generated concurrently with reading of data referenced by the read command from a NAND storage device. A block table for tracking status of LBAs referenced by IO commands may include a reference to the address table which is used to transfer LBAs to host memory as soon as the address table is complete and a block of data referenced by an LBA has been read from the NAND storage device.

8 Claims, 7 Drawing Sheets

METHOD FOR PRP/SGL HANDLING FOR OUT-OF-ORDER NVME CONTROLLERS

BACKGROUND

Field of the Invention

This invention relates to systems and methods for implementing an interface of a storage device to a host system.

Background of the Invention

The NVMe (Non-Volatile Memory Express) specification defines PRP (Physical Region Pages) and SGL (Scatter Gather Lists) as two different ways to describe a scattered data buffer in a host memory. Either one of these is used in most NVMe commands that requires data transfer from or to the host memory. PRP describes a list of pointers to a fixed-size host memory.

An SGL is a link-list structure whose elements are variable size data buffers. Read data become available to transfer to the host in an out-of-order fashion. To acquire an out-of-order logical block's host buffer address information, the controller needs to trace the link list from the very first entry of the SGL, making the performance suffer significantly under certain traffic patterns. To get around this issue, some prior approaches choose to aggregate the read data for an entire command in the controller buffer before sending it towards the host in-order. This sacrifices read latency, especially for larger read commands.

It would be an advancement in the art to improve the performance of an NVMe controller particularly when processing read commands for an SGL data buffer.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
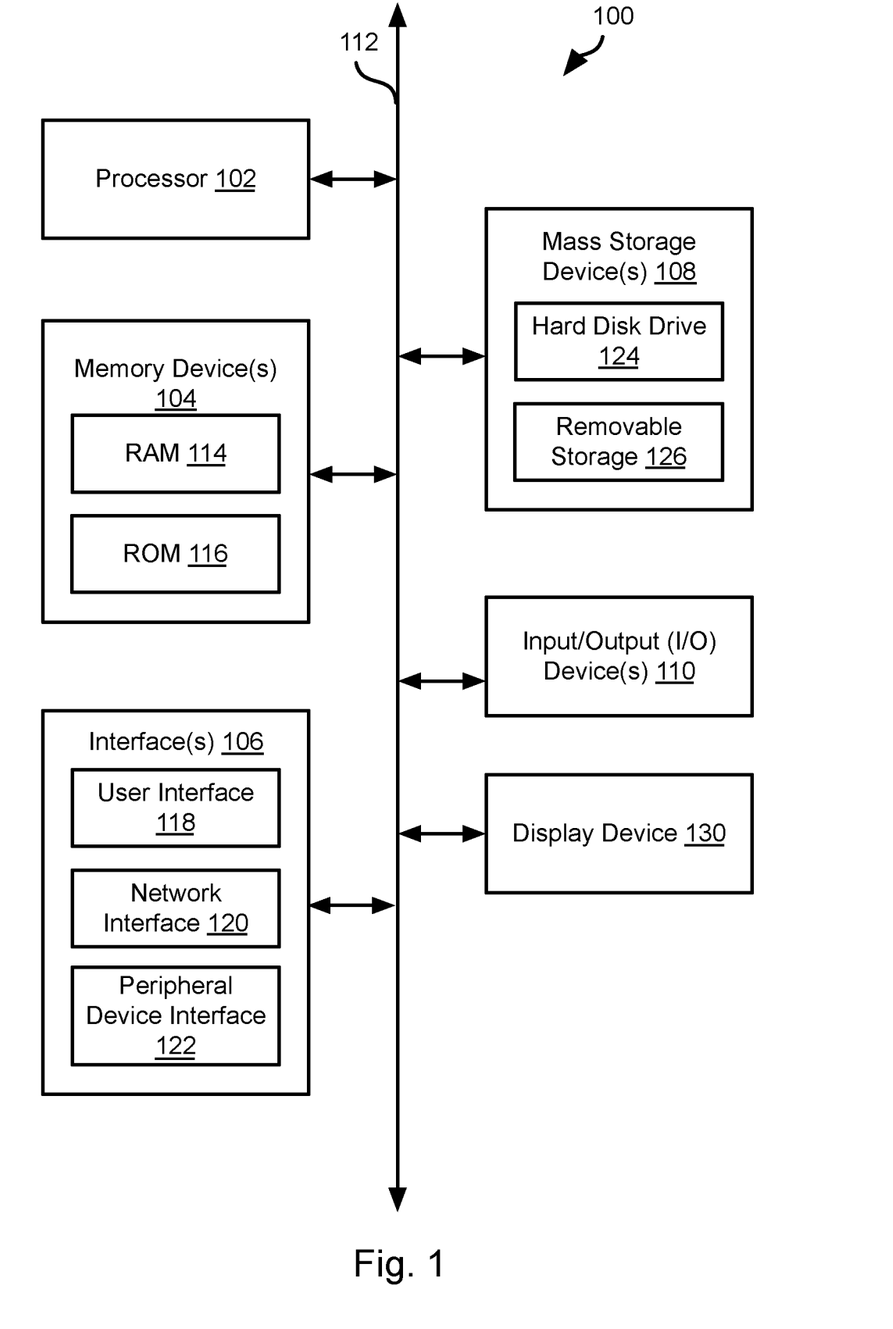
FIG. 1 is a schematic block diagram of a computing system suitable for implementing methods in accordance with embodiments of the invention.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
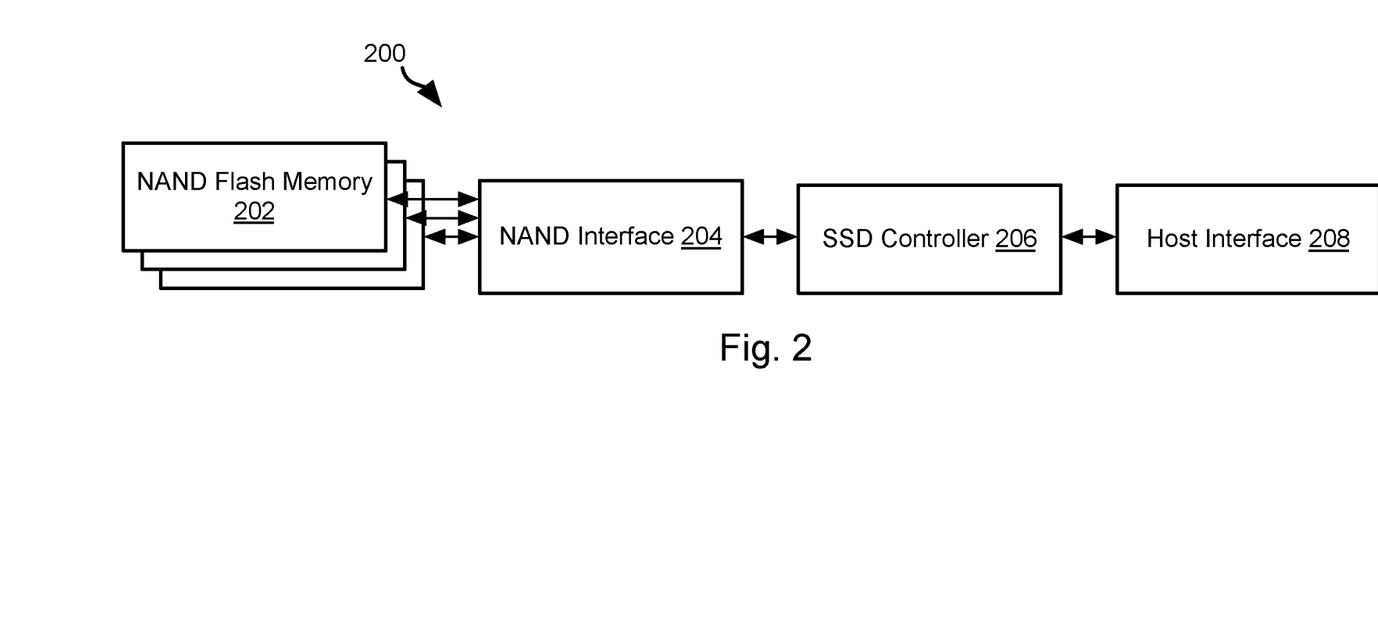
FIG. 2 is a schematic block diagram of components of a storage system suitable for implementing methods in accordance with embodiments of the invention.

Referring to FIG. 2, a typically flash storage system 200 includes a solid state drive (SSD) that may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The methods described below may be performed by the SSD controller 206. The methods described below may be used in a flash storage system 200 or any other type of non-volatile storage device. The methods described herein may be executed by any component in such a storage device.

In particular, the SSD controller 206 may be implemented as a NVMe (non-volatile memory express) controller and may be coupled to the host interface 208 by means of a PCI (peripheral component interconnect express) bus that is programmed to interact with the SSD controller 206 according to the NVMe standard.

Figure 3:
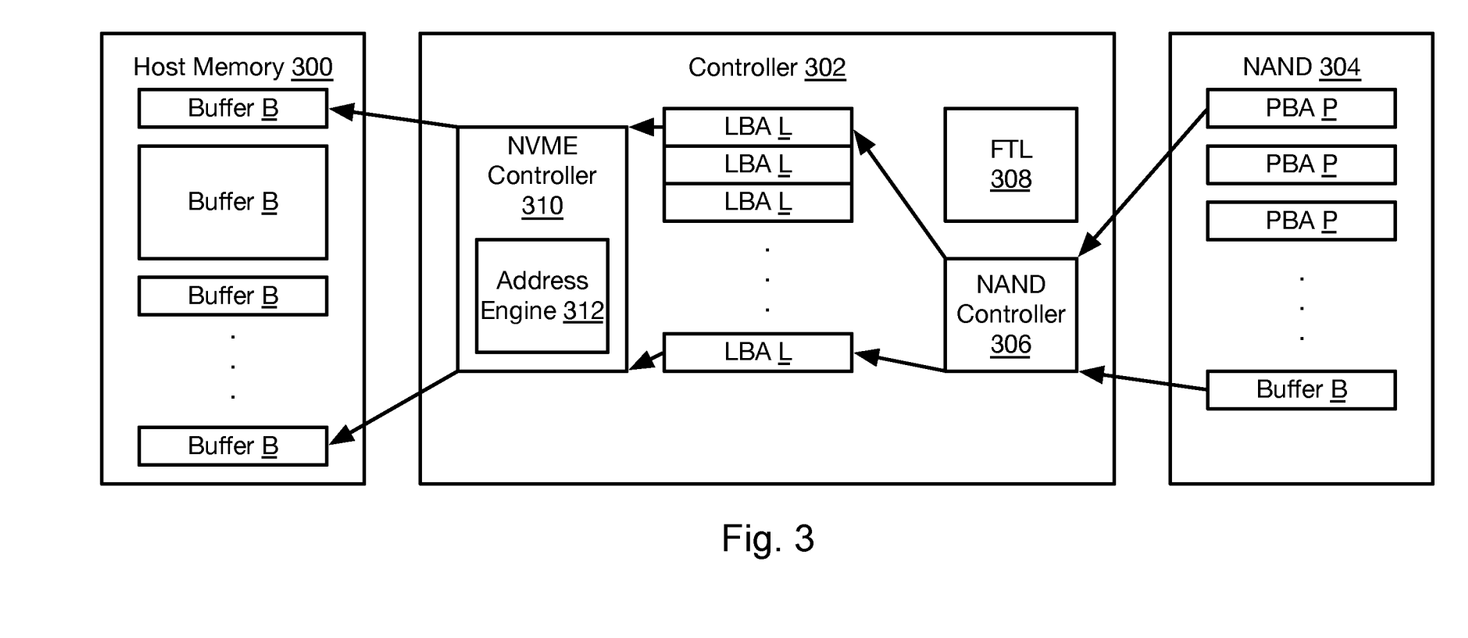
FIG. 3 is a schematic block diagram of an NVMe architecture in accordance with an embodiment of the present invention.

FIG. 3 illustrates an example architecture that includes a host memory 300 coupled to a controller 302 that is an interface to a storage device 304, such as a NAND storage device 304.

The host memory 300 defines an SGL buffer that is defined by a plurality of buffers B that are scattered throughout the memory 300. The SGL buffer is described by an SGL linked list such that each entry of the list, except for the last entry, refers to a next element of the list. Each entry also includes an address in the host memory 300 for a buffer B of the SGL buffer and the length of that buffer B.

Upon receiving a read command, the controller 302 reads data corresponding to logical blocks addresses (LBA) L from physical block addresses (PBA) P within the NAND storage device 304. For example, the controller 302 may include a NAND controller 306 that performs this function. The translation between an LBA L to a corresponding PBA P may be performed using a flash translation layer (FTL) 308 as known in the art.

Data corresponding to each LBA L may be read from the NAND 304 and stored in a buffer such as a command memory buffer (CMB) internal to the controller 302 or implemented using a portion of the host memory 300. The data then may be transferred to a corresponding buffer B in the host memory 300 as described in the methods below.

The methods below may be implemented using a NVMe (Non-Volatile Memory Express) controller 310 that implements an interface to a host device, specifically to the host memory 300 of a host device to which the controller 302 and NAND storage device 304 are coupled. For example, the NVMe controller 310 may interface with the host interface 208 of a host device.

The NVMe controller 310 or some other component within the controller 302 may implement an address engine 312. The address engine 312 may traverse an SGL linked list defining an SGL buffer to which data for the LBAs L is to be written for a read command. In particular, the address engine 312 may assemble an address table representing the linked list in order to reduce latency of a read command. The manner in which the address table is assembled and used is described in greater detail below.

Figure 4:
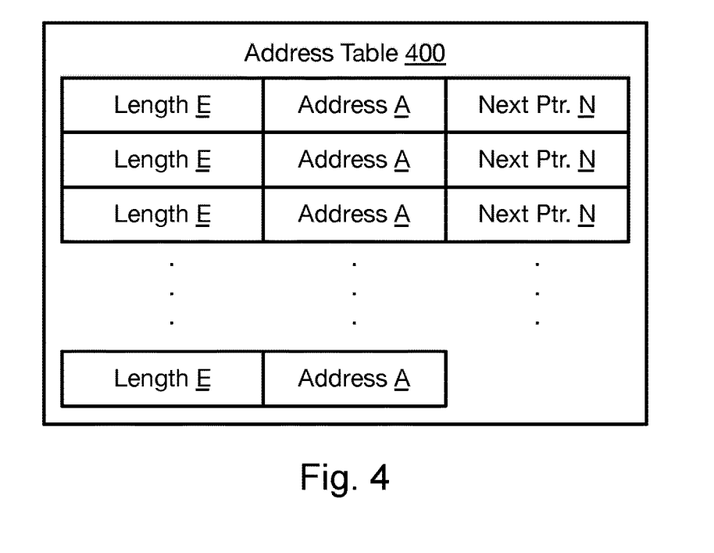
FIG. 4 is a diagram of an address table populated for an SGL in accordance with an embodiment of the present invention.

FIG. 4 illustrates an address table 400 that may be assembled by the controller 302, such as by means of the address engine 312, by a traversing the linked-list data structure of an SGL buffer. As is apparent in FIG. 4, each entry of the address table 400 includes a length E of the buffer B represented by the entry, e.g. a size of the portion of the memory 300 occupied by the buffer B, such as represented as a number of bytes, a number of data words (e.g., 16, 32, or 64 bit data words) number of blocks (e.g. 1, 2, 3, or 4 KB blocks), or some other representation of size.

The entry in the address table 400 for a buffer B may further include an address A within the host memory 300 at which the buffer B begins. The entry in the address table 400 for a buffer B may further include a pointer N that references another entry in the address table 400. For example, the table may be a portion of memory within the controller 302 or in the host memory 300 such that the pointer N references an address within this memory at which another entry of the address table 400 is located. The linked list structure of an SGL buffer is therefore represented by the address table 400. An entry in the address table 400 for the last element in the linked-list structure defining an SGL buffer may exclude the pointer N.

Figure 5:
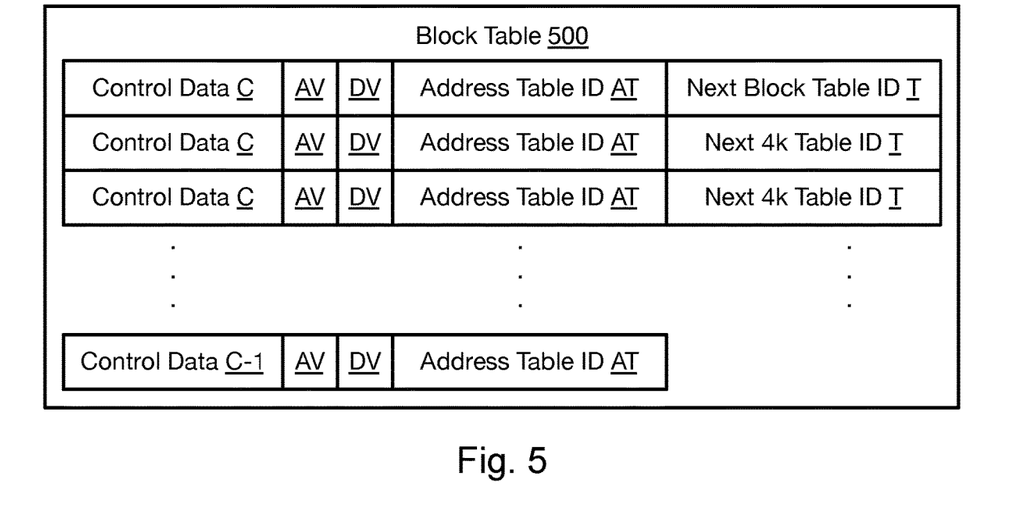
FIG. 5 is a diagram of a block table populated for an SGL in accordance with an embodiment of the present invention.

Referring to FIG. 5, in some embodiments, a block table 500 may also be maintained by the controller 302, such as in a memory within the controller 302 or in the host memory 300. The block table 500 may record the status of logical blocks of data being processed by the controller 302. In particular, a logical block of data may be a block of 4 KB of data in some implementations. Other sizes of blocks, such as 1 KB, 2 KB, 8 KB, or larger may be represented by each entry in the block table 500. Each block of data may be identified by an LBA in the block table 500, such as in the control data C. Each LBA that is the subject of a read or write command currently being processed by the controller 302 may have an entry in the block table 500.

A typical SSD controller 302 maintains a pool of resources to manage logical blocks throughout their lifespan inside the controller. Most controllers assign resources in units of 4 KB since this matches the most common logical block size. In some instances, logical blocks are managed in units of 8 KB or larger to shrink the memory needed to store a FTL mapping table. A typical SSD architecture maintains a table with one entry per 4 KB data block and keeps track of the state of the data, location of the data, etc.

The entry for a logical block (also referred to as a "block tag" herein) may include control data C that indicates a command and possibly parameters of a command being executed with respect to a block. The control data C may further include the LBA of the block represented by the entry. The control data C may further indicate a status of data corresponding to a command.

In the disclosed embodiments, the entry in the block table 500 for a logical block is extended relative to prior approaches to further include an address table identifier AT that identifies an address table 400 storing a representation of an SGL buffer for receiving data for the logical block that is read from the storage device 304. In some embodiments, the data that is to be processed by a command is larger than one logical block, e.g. is performed for multiple LBAs. Accordingly, an entry in the block table may include a next block table identifier T that refers to another entry in the block table 500. Accordingly, any number of entries in the block table 500 may be linked together to define a number of logical blocks implicated by a command.

As discussed in greater detail below, each entry in the block table 500 may further include flags indicate a status of execution of a command with respect to the logical block represented by the entry. In particular, an address valid flag AV indicates that one or more address tables 400 for the logical block represented by an entry in the block table 500 are complete. A data valid flag DV indicates that data to be read from the storage device 304 has been retrieved, i.e. read and written to a buffer such as a command memory buffer (CMB).

Figure 6:
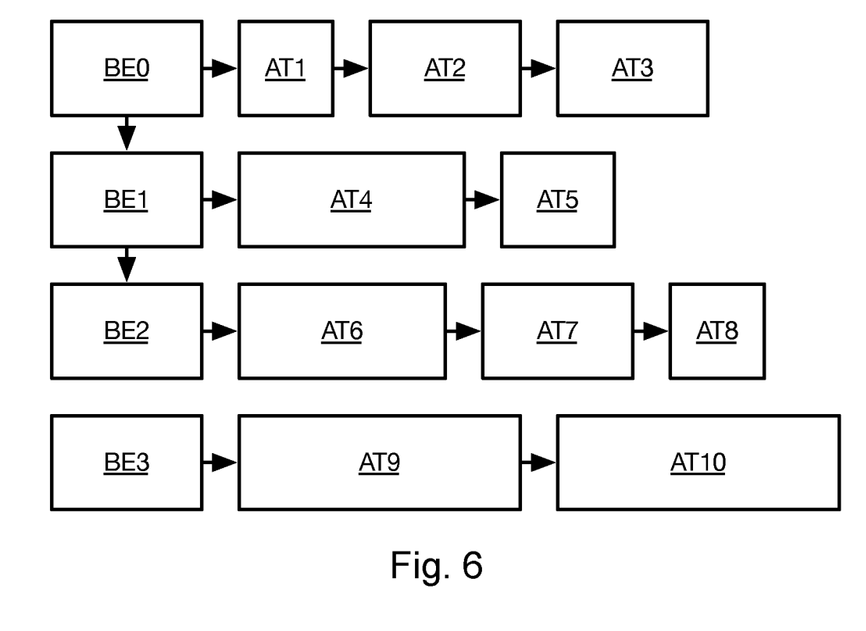
FIG. 6 is a diagram representing data recorded in the block table and a plurality of address tables in accordance with an embodiment of the present invention.

FIG. 6 illustrates the data structure represented by a block table 500 and a plurality of address tables 400. For example, a block table entry BE0 may reference address table AT1, which references address table AT2, which references AT3. Likewise block table entry BE0 may reference block table entry BE1, which references address table AT4, which references address table AT5. Block table entry BE1 may reference block table entry BE2, which references address table AT6, which references address table AT7, which references address table AT8. Another block table entry BE3 may reference address table AT9, which references address table AT10. In the illustrated example, entry BE3 does not reference another block table entry.

As is apparent, the block table 500 and address tables 400 enable an arbitrary configuration of an SGL buffer to be represented. Likewise note that the amount of data represented by a particular address table 400 is arbitrary since the length of each buffer portion represented by an entry of an address table 400 is arbitrary and an address table 400 may include any number of entries, subject to limits on available memory to store the address table 400.

Table 1, below, illustrates an example of an SGL buffer. Table 2 illustrates an address table corresponding to the SGL buffer of Table 1. As is apparent in Table 1, areas of memory for different logical blocks may be contiguous or non-contiguous. The length and address of each area of memory is then represented in the address table of Table 2.

TABLE 1

Example Host Memory Buffer Memory Locations

| Length | Address |
|---|---|
| 6 KB | 64'h0 |
| 8 KB | 64'h10000000 |
| 2 KB | 64'h20000000 |

TABLE 2

Address Table for Table 1.

| Entry Number | LBA | Length | Address | Next Ptr |
|---|---|---|---|---|
| 0 | LBA 0 | 4096 B | 64'h00000000 | NULL |
| 1 | LBA 1 | 2048 B | 64'h00001000 | 2 |
| 2 | LBA 1 | 2048 B | 64'h10000000 | Null |
| 3 | LBA 2 | 4096 B | 64'h10000800 | Null |
| 4 | LBA 3 | 2048 B | 64'h10001800 | 5 |
| 5 | LBA 3 | 2048 B | 64'h20000000 | Null |

Figure 7:
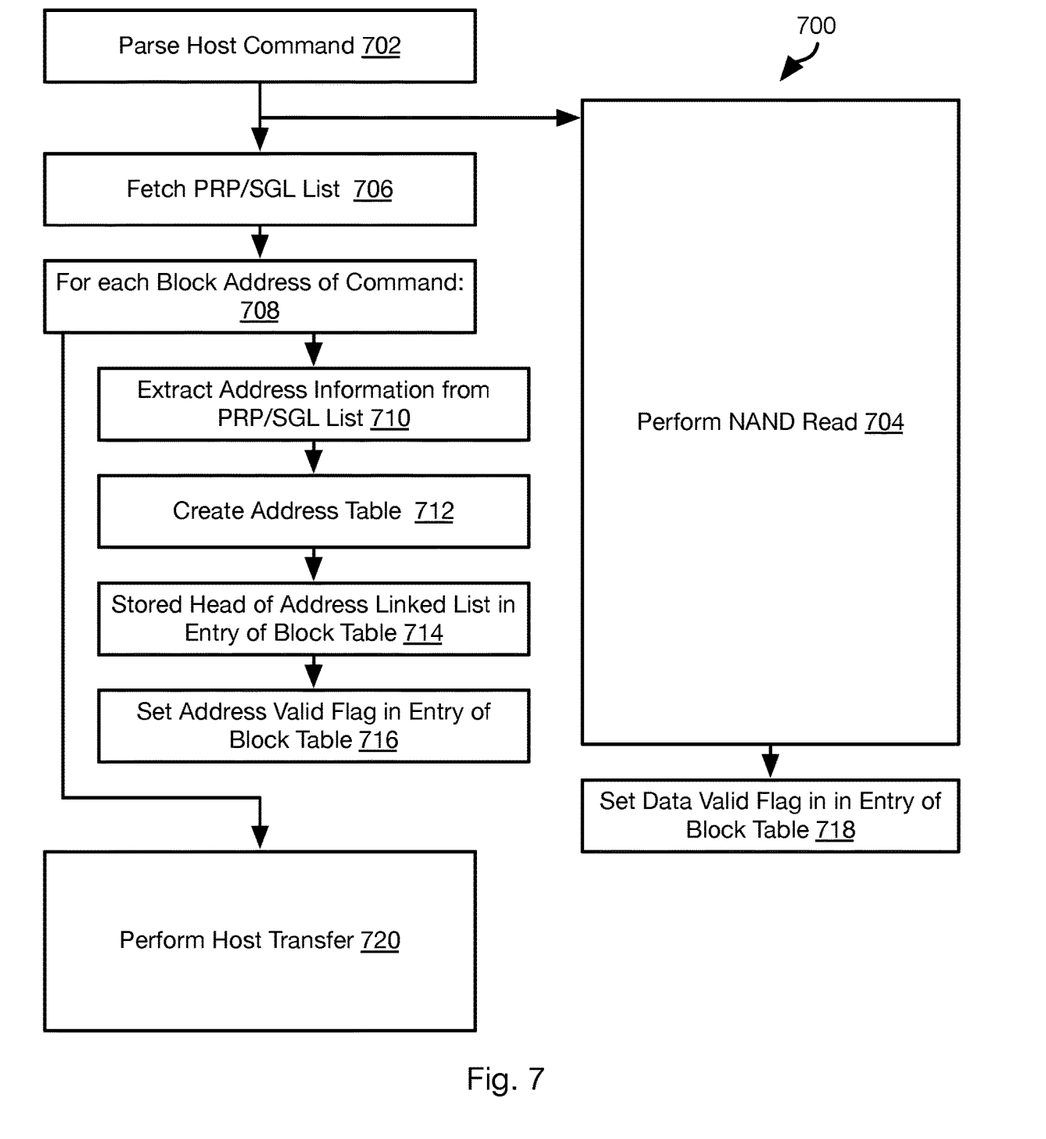
FIG. 7 is a process flow diagram of a method for processing a read command using the block table and one or more address tables in accordance with an embodiment of the present invention.

FIG. 7 illustrates a method 700 for processing a read command. The method 700 may be executed by the controller 302. The method 700 may be initiated in response to receiving a read command from a host device, i.e. the host device including the host memory 300.

The method 700 may include parsing 702 the host command and extracting various items of data from it, such as one or more LBAs indicating locations data blocks to be read from the storage device 304.

The method 700 may include fetching 706 PRP/SGL data for the LBAs to be read from the storage device 304. In particular, for a particular block address, a PRP/SGL linked list mapped to that block address may be stored in the memory device 300, a memory within the controller 302, or another memory device. Accordingly, for each LBA referenced by the host command, the method 700 may or may not include fetching 706 the PRP/SGL linked list for that LBA. The PRP/SGL data buffer boundary may be independent from LBA/block boundary. A LBA may need part of a host data buffer or multiple host data buffers, which means that a PRP/SGL data buffer might contain host buffer information for multiple LBAs. In this case, one PRP/SGL fetch 706 may cover multiple LBAs.

The method 700 may include performing 708, for each LBA referenced in the command ("the subject LBA"), some or all of steps 710 through 716.

This may include extracting 710 address information from the PRP/SGL linked list fetched 706 for the subject LBA and creating 712 an address table 400. In particular, each element in the linked list may include storing 714 a starting address in the memory 300 and a length of a buffer portion starting at that address. Each element, other than a last element, also includes a reference to another element in the linked list, e.g. an address or offset within the data structure representing the linked list.

Accordingly, for each element in the linked list a corresponding entry is added to the address table 400 that includes a length E, address A corresponding to the length and address in that element. Each entry for each element other than the last element will also include a next pointer N that references another entry in the address table 400 corresponding to the element in the linked list pointed to by the each element in the data structure representing the linked list.

The method 700 may further include storing the address of a first entry in the address table created at step 712 in an entry in the block table 500 corresponding to the subject LBA. The address valid tag AV in the entry corresponding to the subject LBA may then be set 716, e.g. set to a value indicating that the address data for that block address is valid and ready to be used to transfer data to the host memory 300.

The method 700 may include performing 704 a NAND read to retrieve data corresponding to one or more LBAs, including the subject LBA, included in the host command as determined at step 702. Step 704 may be performed in parallel with some or all of steps 706 through 716. In particular, a major portion (at least 50 percent) of the time period in which step 704 is performed may overlap with performance of one or more of steps 706 through 716. In some embodiments, all of steps 708 through 716 described below are performed prior to completion of step 704 and a major portion (at least 50 percent, preferably 100 percent) of a time period in which steps 708 through 716 are performed overlaps with performance of step 704.

In some embodiments, step 704 is performed by the NAND controller 306 whereas steps 706-716 are performed by the NVME controller 310 thereby enabling parallel execution.

Step 704 may include translating the subject LBA into a reference to one or more physical block addresses (PBA) P (see FIG. 3) within the storage device 304 and reading data from these PBA P and storing the read data into a buffer within the controller (e.g., a CMB) or within a controller buffer implemented by the host memory 300. When the data corresponding to the subject LBA has been read from the storage device 304, the data valid flag DV in the entry in the block table 500 corresponding to the subject LBA is set 718, e.g. set to a value indicating that the data for the subject LBA is valid and ready to be transferred to the host memory 300.

Once both the address valid flag AV and data valid tag DV are both set, the controller 302 begins performing 720 transfer of the data read at step 704 to the host device. In particular, chunks of data corresponding to the subject LBA are copied to addresses indicated by the address table 400, i.e. the address table referenced in the entry in the block table 500 corresponding to the subject LBA. In particular, the read data may be copied to locations within a scattered buffer by writing chunks to locations indicated by the address fields A of the address table 400 such that a chunk written to an address A has length E indicated by the entry in the address table 400 referencing address A. As mentioned above, the controller 302 may store the address of a first entry in the address table created at step 712 in an entry in the block table 500 corresponding to the subject LBA. So given an LBA, the controller 302 can look up its first address buffer entry from the block table 500. Note that, inasmuch as the address tables 400 and block table 500 describe the location of each part of a scattered buffer and its ordering, the method 700 may be performed for each LBA in a read command without regard to ordering.

The approach of FIG. 7 further has the advantage that it does not require modification of other components of the system. In particular, the storage device 304, host memory 300, and a host interface 208 do not require modification in order to implement the method 700. In particular, the retrieval of data and the generation of the address table 400 are performed by the controller 302. Likewise, the function of the NAND controller 306 and FTL 308 may be identical to these components in prior approaches. In some embodiments, only the NVME controller 310 is modified relative to prior approaches such that the NVME controller 310 is programmed to generate the address table 400, generate the modified block table 500, set the AV and DV flags, and control host transfer as described above with respect to FIG. 7.

Note also that the method 700 may be extended such that the address processing engine 312 could also pre-process a host metadata buffer address so that a data transfer engine of the controller 302 does not need logic to determine whether the metadata is transferred as part of an extended data LBA (Data Integrity Feature (DIF)), or as part of a separate buffer (Data Integrity Extension (DIX)).

Figure 8A:
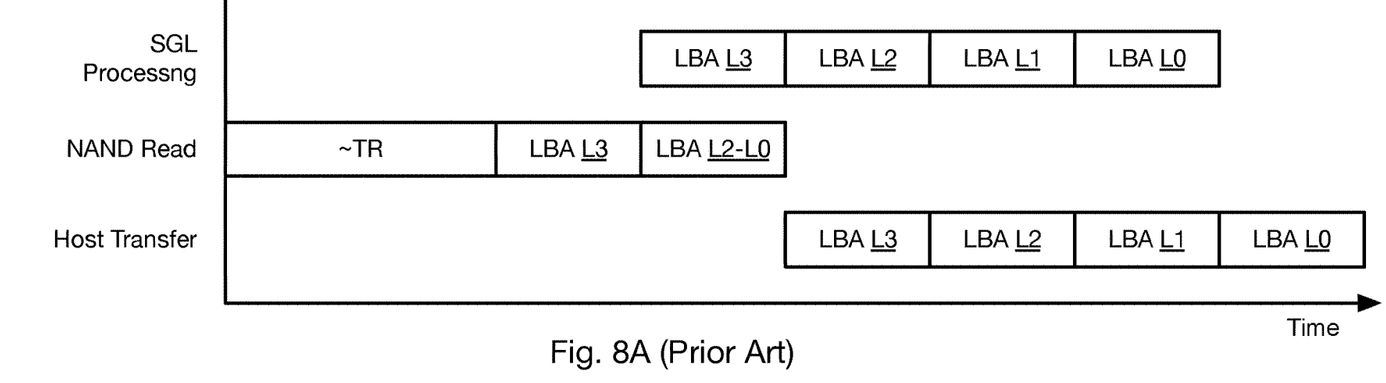
FIG. 8A is a timing diagram illustrating the processing of a read command in accordance with the prior art.
Figure 8B:
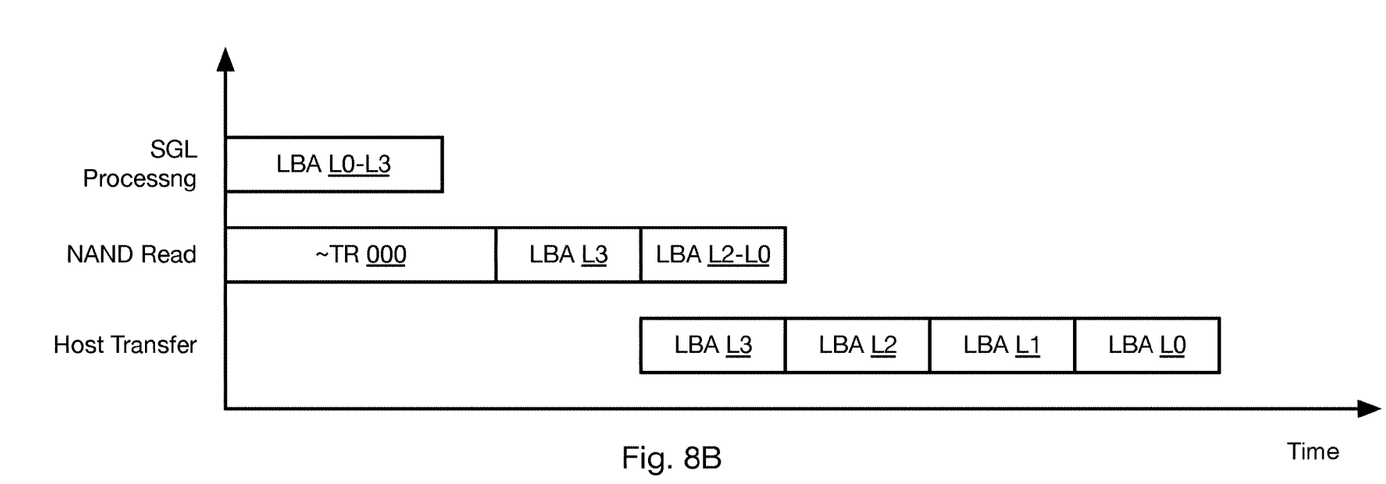
FIG. 8B is a timing diagram illustrating the processing of a read command in accordance with an embodiment of the present invention.

FIG. 8A illustrates the timing of a prior art approach for performing a read operation. FIG. 8B illustrates the timing of a read operation performed according to the method 700.

As shown in FIG. 8A, a NAND read includes the latency of a read operation (TR) plus time required to transfer logical blocks L3 and L2-L0 from the storage device 304. Once one of the logical blocks (L3 in this example) is read, SGL processing commences and includes identifying the buffer locations in the PRP/SGL buffer for the logical blocks L3 to L0. Once the starting address in the host buffer is determined for the first logical block (L3 in this example) host transfer of the logical blocks is performed.

As shown in FIG. 8B, using the approach of the method 700, the NAND read latency TR and the time spent reading logical blocks L3 to L0 occurs concurrently with SGL processing of logical blocks L3 to L0, which results in generation of the address tables 400 for L3 to L0 and updating of the block table 500 to reference the address tables 400. Accordingly, host transfer may begin as soon as at least one logical block (L3 in this example) has been read from the storage device 304.

The examples of FIGS. 8A and 8B assume that a host issues a read command for LBA0-LBA3, which all sit on different NAND LUNs (logical units), causing data to be read out from the NAND device 304 in reversed order: LBA3, LBA2, LBA1, LBA0.

In the approach of FIG. 8A, processing starts when the first read data becomes available in the NAND. Due to its out-of-order nature, the SGL processing engine of a prior-art controller takes longer for the four LBAs comparing to in-order SGL processing. Host transfer for each LBA can only start after the element in the SGL linked list for the host buffer has been extracted and processed.

The performance of the approaches of FIGS. 8A and 8B will be compared based on the following assumptions:

Out-of-order SGL processing takes 2 µs to extract and process the corresponding SGL for an LBA.

Host Data Transfer is at 4 GB/s, so each 4 KB takes 1 µs to transfer.

For these assumptions, the method 700 can reduce the latency by 1 µs×(NLB+1) as compared to the prior art, where NLB is the number of logical blocks read. In the example of FIGS. 8A and 8B, the saving is 5 µs.

The prior art's IOPS (input output operations per second) is bottlenecked by SGL processing thus the limit is 500K IOPS. In contrast, using the method 700 to process the LBAs of a read command could potentially achieve 1 M IOPS, an improvement of 100%.

The method 700 further provides an improvement over prior approaches that gather all the logical blocks referenced by a command before initiating the host transfer so that SGL can be processed in-order as data is being transferred to the host.

For a sequential read command of 128 KB, the prior art will need to collect 124 KB more data than the new method before initiating the first 4 KB of host transfer. Assuming in-order SGL processing is fast, and NAND transfer is also on average 4 GB/s, the method 700 saves roughly 30 µs in terms of latency.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method comprising:
receiving, by a storage controller coupled to a storage device, a read command referencing a data block; and
performing in parallel:
(a) generating a data structure representing a linked list of buffer locations within a host memory corresponding to the data block, wherein (a) further comprises:
generating an address table in which each entry of the address table includes a buffer location from the linked list and a length of the buffer location from the linked list, and a reference to another entry in the address table for each entry other than a last entry in the address table
adding an entry referencing the data block in a block table; and
adding a reference to the address table to the entry referencing the data block, wherein the entry referencing the data block in the block table further includes a reference to another entry in the block table;
(b) reading the data block from the storage device;
identifying a plurality of buffer locations corresponding to the data block from the address table; and
(c) writing the data block to the plurality of buffer locations, wherein the data block is one of a plurality of data blocks and (c) is performed for the plurality of data blocks in an order that does not correspond to an order of the buffer locations in the linked list, wherein the entry referencing the data block in the block table further includes a data ready flag and an address ready flag; and
wherein the method further comprises:
setting the address ready flag when (a) is complete;
setting the data ready flag when (b) is complete; and
performing (c) only when the address ready flag and data ready flag are set.

2. The method of claim 1, wherein (a) completes before (b) completes.

3. The method of claim 1, wherein the linked list of buffer locations includes a scatter-gather list (SGL) according to the non-volatile memory express (NVMe) specification.

4. The method of claim 1, wherein the storage device is a NAND storage device.

5. A controller coupled to a storage device and programmed to:

receive a read command referencing a data block; and
perform in parallel:
  (a) generate a data structure representing a linked list of buffer locations within a host memory corresponding to the data block; and
  (b) read the data block from the storage device, wherein the controller is further programmed to perform (a) by:
    generating an address table in which each entry of the address table includes a buffer location from the linked list and a length of the buffer location from the linked list, and a reference to another entry in the address table for each entry other than a last entry in the address table;
  wherein the controller is further programmed to perform (a) by:
    adding an entry referencing the data block in a block table; and
    adding a reference to the address table to the entry referencing the data block;
  wherein the entry referencing the data block in the block table further includes a reference to another entry in the block table;
  wherein the controller is further programmed to:
    identify a plurality of buffer locations corresponding to the data block from the address table; and
  (c) write the data block to the plurality of buffer locations, wherein the data block is one of a plurality of data blocks referenced by the read command and the controller is further programmed to perform (c) for the plurality of data blocks in an order that does not correspond to an order of the buffer locations in the linked list;
  wherein the entry referencing the data block in the block table further includes a data ready flag and an address ready flag; and
  wherein the controller is further programmed to:
    set the address ready flag when (a) is complete;
    set the data ready flag when (b) is complete; and
    perform (c) only when the address ready flag and data ready flag are set.

6. The controller of claim 5, wherein the controller is programmed to complete (a) before completing (b).

7. The controller of claim 5, wherein the linked list of buffer locations includes a scatter-gather list (SGL) according to the non-volatile memory express (NVMe) specification.

8. The controller of claim 5, wherein the storage device is a NAND storage device.

* * * * *